United States Patent [19]
Cur et al.

[11] Patent Number: 5,377,498
[45] Date of Patent: Jan. 3, 1995

[54] MULTI-TEMPERATURE EVAPORATOR REFRIGERATION SYSTEM WITH VARIABLE SPEED COMPRESSOR

[75] Inventors: Nihat O. Cur, Royalton Township, Berrien County; Steven J. Kuehl, Lincoln Township, Berrien County; Douglas D. LeClear, St. Joseph Township, Berrien County, all of Mich.

[73] Assignee: Whirlpool Corporation, Benton Harbor, Mich.

[21] Appl. No.: 101,129

[22] Filed: Aug. 2, 1993

Related U.S. Application Data

[63] Continuation-in-part of Ser. No. 930,104, Aug. 14, 1992, Pat. No. 5,231,847.

[51] Int. Cl.6 .................. F25D 17/08; F25B 39/02
[52] U.S. Cl. .................. 62/187; 62/176.6; 62/197; 62/430; 62/511
[58] Field of Search .............. 62/176.1, 176.3, 176.6, 62/186, 187, 180, 197, 205, 228.4, 511, 326, 430

[56] References Cited

U.S. PATENT DOCUMENTS

| | | | |
|---|---|---|---|
| 2,112,039 | 4/1938 | McLenegan | 62/176.6 |
| 2,323,408 | 7/1943 | Miller | 62/197 X |
| 2,485,894 | 10/1949 | Kuhn | 62/176.6 X |
| 4,122,687 | 10/1978 | McKee | 62/187 |

*Primary Examiner*—Harry B. Tanner
*Attorney, Agent, or Firm*—Joel M. Van Winkle; Stephen D. Krefman; Robert O. Rice

[57] ABSTRACT

A method and apparatus for operating a refrigeration appliance having a plurality of compartments in direct communication with a single evaporator wherein the evaporator operates at a plurality of different evaporating pressures for controlling temperature and humidity within each of the plurality of compartments. By controlling the temperature of the evaporator used for cooling a compartment, relative control of humidity within each compartment selected for operation at a temperature greater than substantially below freezing may be obtained. In this fashion, high humidity compartments operating at a freezing temperature may be provided as well as high humidity compartments operating at somewhat above freezing. Furthermore, all compartments, regardless of their selected temperature, may be operated at a relatively low humidity if desired. Additionally, subordinate compartments, not in direct communication with the evaporator, may be provided wherein the subordinate compartments are cooled indirectly by controllable communication between the subordinate compartment and an adjacent compartment. The present invention further provides for having an isolated controlled temperature compartment wherein the controlled temperature compartment is cooled by transfer of heat from the controlled temperature compartment into an adjacent flask containing a phase change material. The flask is independently in communication with the evaporator, such that the phase change material may remain at its transition temperature.

32 Claims, 6 Drawing Sheets

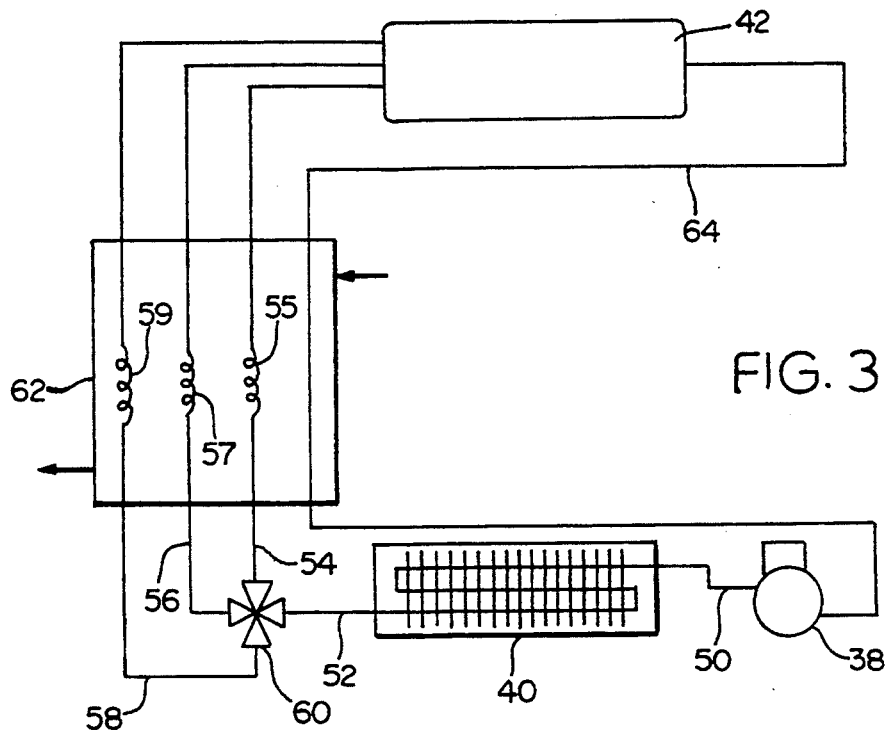
FIG. 3
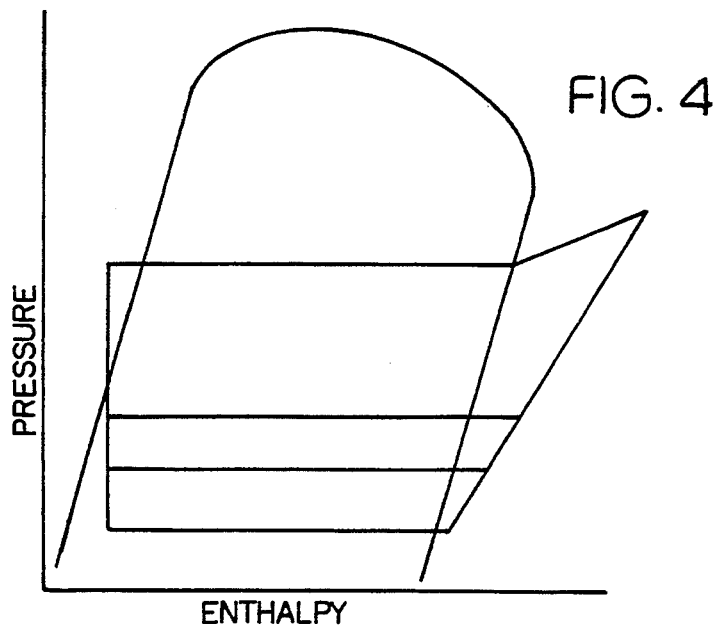
FIG. 4
FIG. 5
| | EVAPORATION PRESSURE | EVAPORATOR TEMPERATURE | CORRESPONDING COMPARTMENT TEMPERATURE |
|---|---|---|---|
| CAPILLARY 55 | "LOW" 0-2 PSIG | -27 C | "COLD" -18 C |
| CAPILLARY 57 | "MEDIUM" 12-16 PSIG | -12 C | "FREEZING" 0 C |
| CAPILLARY 59 | "HIGH" 17-21 PSIG | -9 C | "COOL" 5 C |

MULTI-TEMPERATURE EVAPORATOR REFRIGERATION SYSTEM WITH VARIABLE SPEED COMPRESSOR

This is a continuation-in-part of application Ser. No. 07/930,104, filed Aug. 14, 1992, now U.S. Pat. No. 5,231,847.

BACKGROUND OF THE INVENTION

The present invention relates to refrigeration appliances and more particularly to a refrigeration system having a single evaporator for cooling multiple refrigeration compartments more efficiently.

In typical domestic refrigeration appliances, the appliance often times has two separate compartments which are maintained at different temperatures. For example, there may be a freezer compartment which has a temperature maintained below 0° C. and a fresh food compartment which is maintained at a temperature somewhat above 0° C. In many commercially available refrigeration devices a single evaporator is used with an evaporating pressure of approximately 0-2 PSIG. Air is circulated over the evaporator simultaneously from both the freezer compartment and the refrigerator compartment. This "mixed" air flow scheme results in dehumidification of the refrigerator compartment and subsequent frost build-up on the single evaporator coil, necessitating a periodic defrost cycle to get rid of the accumulated frost.

Also, using a single evaporator operating at a single evaporating pressure to provide the cooling for two compartments which are maintained at different temperatures results in an inefficient use of the refrigeration system for the higher temperature compartment.

U.S. Pat. No. 4,015,182 disclosed the use of a variable capacity DC ECM compressor and a single evaporator in an automobile air conditioner.

U.S. Pat. No. 4,916,916 discloses the use of a phase change energy storage material in connection with a multiple evaporator refrigeration system.

SUMMARY OF THE INVENTION

The present invention provides a method and apparatus for operating a refrigeration appliance with a single evaporator in which the evaporator circuit operates at different evaporating pressures. In one embodiment disclosed, there are a plurality of air flow circuits over the single evaporator, cooling a plurality of different temperature compartments. During the cooling of the compartments, the evaporator is controlled to operate at various different temperatures. During the cooling of a compartment configured to operate as a freezer compartment of around −18° C., the evaporator runs at approximately 0-2 PSIG evaporation pressure due to flow through high resistance capillaries, or other known expansion devices. A second, intermediate compartment may be controlled to operate at freezing or around 0° C., in which the evaporator may be controlled to 12-16 PSIG. During the cooling of a third compartment configured to operate as a fresh food compartment at or around 5° C., the evaporator runs approximately at 17-21 PSIG evaporation pressure due to flow through a lower resistance capillary, at which pressure level, significant energy reductions are achieved. Additionally, swing compartments, not in direct communication with the evaporator, may be provided wherein the swing compartments are cooled indirectly by controllable communication between the swing compartment and an adjacent compartment.

In another embodiment, a refrigerator is provided having a plurality of compartments cooled as described above in combination with an isolated controlled temperature compartment wherein the controlled temperature compartment is cooled by transfer of heat from the controlled temperature compartment into an adjacent flask containing a phase change material. The flask is independently in communication with the evaporator, such that the phase change material may remain at its transition temperature. In this fashion, the controlled temperature compartment is cooled without any direct circulation of air over the evaporator and through the controlled temperature compartment.

A single compressor, which may be a variable speed compressor, supplies the refrigerant through the condenser which serves to feed either the high, intermediate, or low pressure expansion devices such as capillary tubes, orifices, expansion valves, etc. Although various circuit options are disclosed, each employs some type of solenoid valve on the capillary tubes to determine which evaporation pressure is used.

By controlling the temperature of the evaporator used for cooling a compartment, relative control of humidity within each compartment selected for operation at a temperature greater than the freezer temperature may be obtained. In this fashion, high humidity compartments operating at a temperature at around 0° C. may be provided as well as high humidity compartments operating at somewhat above 0° C. Furthermore, all compartments, regardless of their selected temperature, may be operated at a low relative humidity if desired.

In some devices in which the invention is used, a phase change material may be utilized either in association with the evaporator, or within the compartments in order to reduce the overall energy consumption further by the refrigeration appliance.

The present invention also describes means to have convertible refrigerator compartments. That is, in the preferred embodiment, any or all of the compartments can be used at any of the selectable temperatures.

BRIEF DESCRIPTION OF THE DRAWINGS

FIG. 3 is a first embodiment of a refrigeration circuit diagram.

FIG. 4 is a representation of the refrigeration cycle on a pressure-enthalpy diagram.

FIG. 5 is a table illustrating the resultant evaporation pressure and evaporator temperature for different refrigeration circuits.

DETAILED DESCRIPTION OF THE PREFERRED EMBODIMENTS

Figure 1:
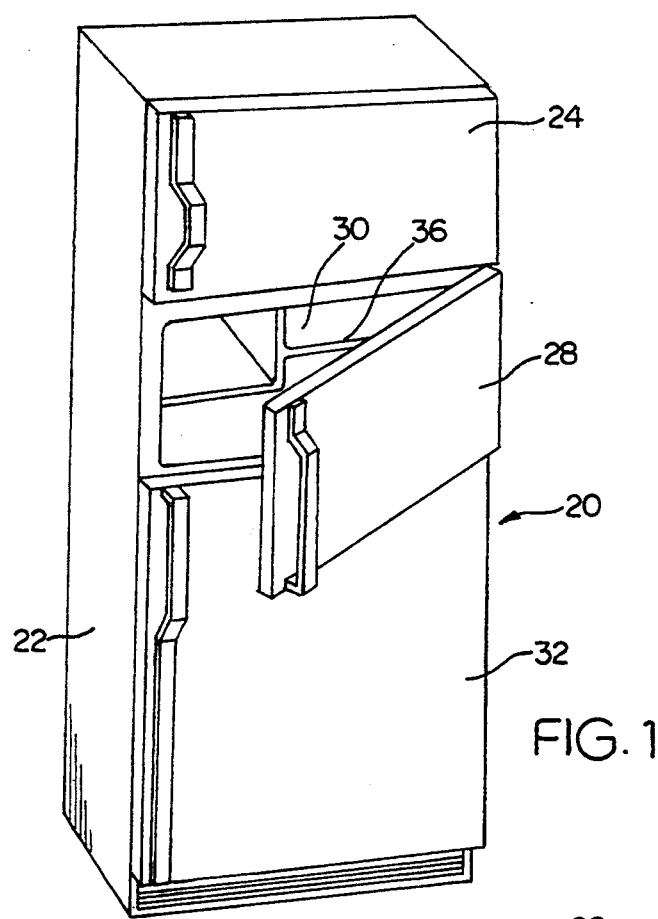
FIG. 1 is a perspective view of a refrigeration appliance in which the method embodying the principles of the present invention may be used.
Figure 2:
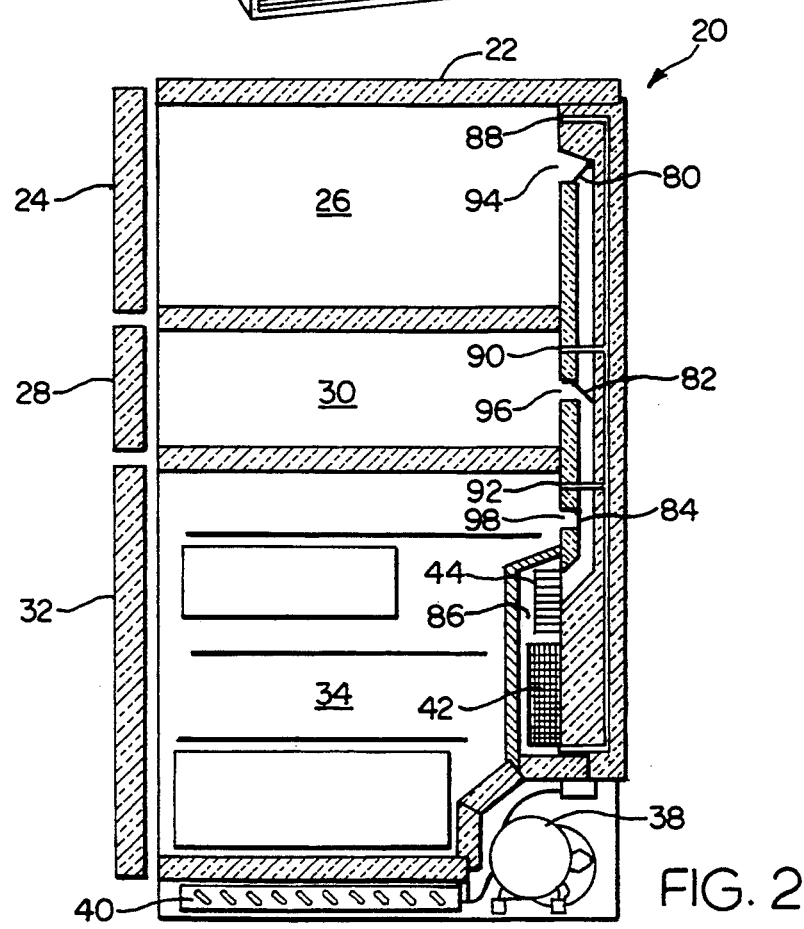
FIG. 2 is a side sectional view of the appliance of FIG. 1.

In FIGS. 1 and 2 there is shown generally a refrigeration appliance at 20 which comprises an exterior cabinet 22 having a first openable door 24 to expose a first interior compartment 26 and a second openable door 28 to expose a second interior compartment 30 and a third openable door 32 to expose a third interior compartment 34. Within each of the compartments 26, 30 and 34, there may be one or more shelves 36 for receiving food articles.

As part of the present invention each of the compartments may be maintained at any of a plurality of selected temperatures and humidity levels. Generally one of the compartments 26, 30, 34, referred to as the freezer compartment, will be maintained at a temperature sufficiently below 0° C. to assure that all of the articles contained within that compartment will be maintained in a frozen state. One of the other two compartments, generally is maintained at around 0° C., to maintain articles placed therein in a highly chilled but not completely frozen condition. While the third compartment may be selected for operation somewhat above 0° C. to maintain the items placed therein in a chilled, but not frozen condition.

In order to maintain the compartments at the desired temperature levels, a refrigeration device is provided which comprises a compressor 38, a condenser 40, and an evaporator 42 in selective communication with one of the compartments 26, 30. 34. An appropriate air moving device 44, such as a motor driven fan or blower, is provided as needed for circulating air from each of the compartments over the evaporator 42 to maintain a fairly consistent temperature throughout each compartment. The circulating air is provided by natural convection in some installed configurations.

A thermostat or temperature sensing means (not shown) is provided for each compartment 26, 30, 34, to provide appropriate signal inputs to a control for the appliance as is known.

In FIG. 3 a refrigeration circuit is illustrated. In this embodiment the single compressor 38 supplies refrigerant through line 50 to the single condenser 40. Refrigerant then flows out of condenser 40 on line 52 and is presented to parallel capillary lines 54, 56, 58. Line 54 includes a low pressure capillary 55, line 56 includes a medium pressure capillary 57 and line 58 includes a high pressure capillary 59. A four position solenoid valve 60 is disposed at the junction of lines 52, 56, 58, and 54. The four position valve 60 is configured to include 3 positions for allowing refrigerant to flow either through line 54, line 56 or line 58, while the fourth position of the valve 60 is to close all of lines 54, 56, and 58. The solenoid valve 60 should preferably be a latching type which requires power for a brief moment (typically a fraction of a second) to change position from one capillary to the other or to the completely closed position.

A regular solenoid valve requires electrical power (5 to 15 watts range) to the coil to remain open or closed (depending on whether the valve is normally closed or open type); therefore necessitating power consumption at least for a certain portion of their operation. Also, some of the power used by the valve coil gets transferred to the refrigerant in the form of heat. Both of these affect the overall refrigeration system energy efficiency to a small extent and reduce the energy savings expected from a sequentially-operated dual temperature evaporator system. The latching solenoid valve (valve 60 in FIG. 3), on the other hand, require only a pulse of (very brief, in terms of milliseconds) electrical input to change position but requiring no further power input to remain open or closed. If the latching type valve is not used, then the valve 60 should preferably be normally closed type, but the invention is not limited to these choices; other combinations are also possible. Lines 54, 56, and 58, pass through a heat exchanger 62 towards evaporator 42. Suction line 64, which exits from evaporator 42, passes through the heat exchanger 62 on its return to the compressor 38.

FIG. 4 is the representation of the sequentially-operated multi-temperature evaporator refrigeration system on a pressure-enthalpy diagram. As shown in FIG. 4, in the first mode, which may correspond to the freezer mode of operation, the evaporation occurs at a low suction pressure in the evaporator 38 similar to the conventional refrigeration system. In the second mode, which may correspond to a mode of operation for cooling a compartment to approximately 0° C., the evaporation takes place at a higher suction pressure in the evaporator 38 than for the first mode. In the third mode, which may correspond to a compartment cooling at somewhat above 0° C., the evaporation of refrigerant takes place at a higher suction pressure in the evaporator 38 that for the second mode. In this fashion, the same evaporator may be used in a multiple temperature mode.

FIG. 5 shows a chart illustrating an example of the resultant evaporator pressure and temperature caused by each capillary. The low pressure capillary 55 creates an evaporation pressure of approximately 0-2 PSIG and an evaporator temperature of approximately −27° C. The medium pressure capillary 57 creates an evaporation pressure of approximately 12 to 16 PSIG and an evaporator temperature of approximately −12° C. The high pressure capillary 59 creates an evaporation pressure of approximately 17-21 PSIG and an evaporator temperature of approximately −9° C.

The above pressure and temperature levels for different modes of operation, can be further improved by the usage of a variable capacity compressor. A variable capacity compressor may run at varying speeds to match the varying cooling load of the refrigeration device compartments.

It can be understood, therefore that the operation of the evaporator 42 with the low pressure capillary 55 may be appropriate for cooling a compartment to around −18° C. (typical freezer temperatures). Operation of the evaporator 42 with the medium pressure capillary 57 may be appropriate for cooling a compartment to around 0° C. Operation of the evaporator 42 with the high pressure capillary 59 may be appropriate for cooling a compartment to around 5° C. (typical fresh food compartment temperatures). Since the compressor runs more efficiently and provides substantially more refrigeration cooling capacity at a higher evaporating pressure, the use of the highest evaporation pressure possible for cooling each compartment, based on the desired compartment temperature, provides for the optimum energy efficiency.

Figure 6:
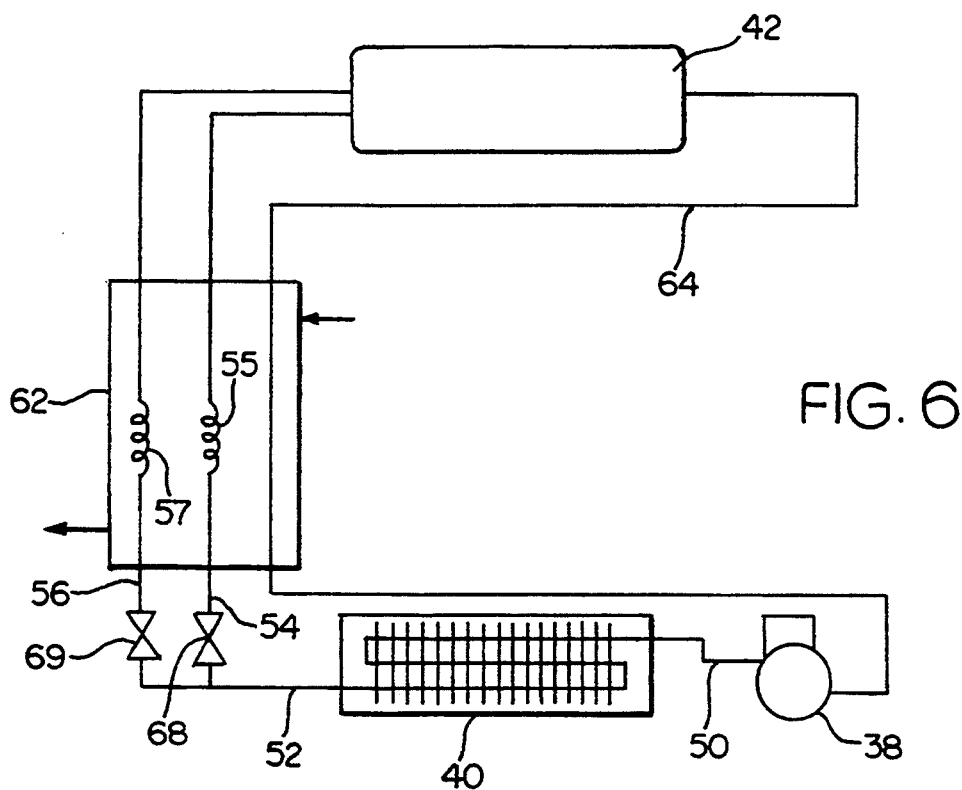
FIG. 6 is a second embodiment of a refrigeration circuit diagram.

A second embodiment of the refrigeration circuit as shown in FIG. 6 contains many of the same components which are identified with the same reference numerals as used in FIG. 3. The primary difference between the embodiment of FIG. 6 and that of FIG. 3 is that a first ON/OFF latching valve 68 is utilized at the inlet to line 54 and a second ON/OFF latching valve 69 is utilized at the inlet to line 56 to allow the refrigerant to flow through either the capillary 55 on the line 54, through the capillary 57 on the line 56, or through both capillaries 55 and 57 on lines 54 and 56. For example, the refrigerant flow may be directed through the capillary 55 on line 54 when a below freezing mode of operation is desired. When an at-freezing mode is desired, the refrigerant flow may be directed over the capillary 57 on the line 56. Finally, an above freezing mode of operation may be achieved by directing the refrigerant flow over both capillaries 55 and 57 on lines 54 and 56 which corresponds to capillary 59 and line 58 of FIG. 3. If the latching type valve is not used, then the valves 66 and 68 should preferably be normally open type, but a normally closed valve can also be used with a slightly greater energy penalty.

Figure 7:
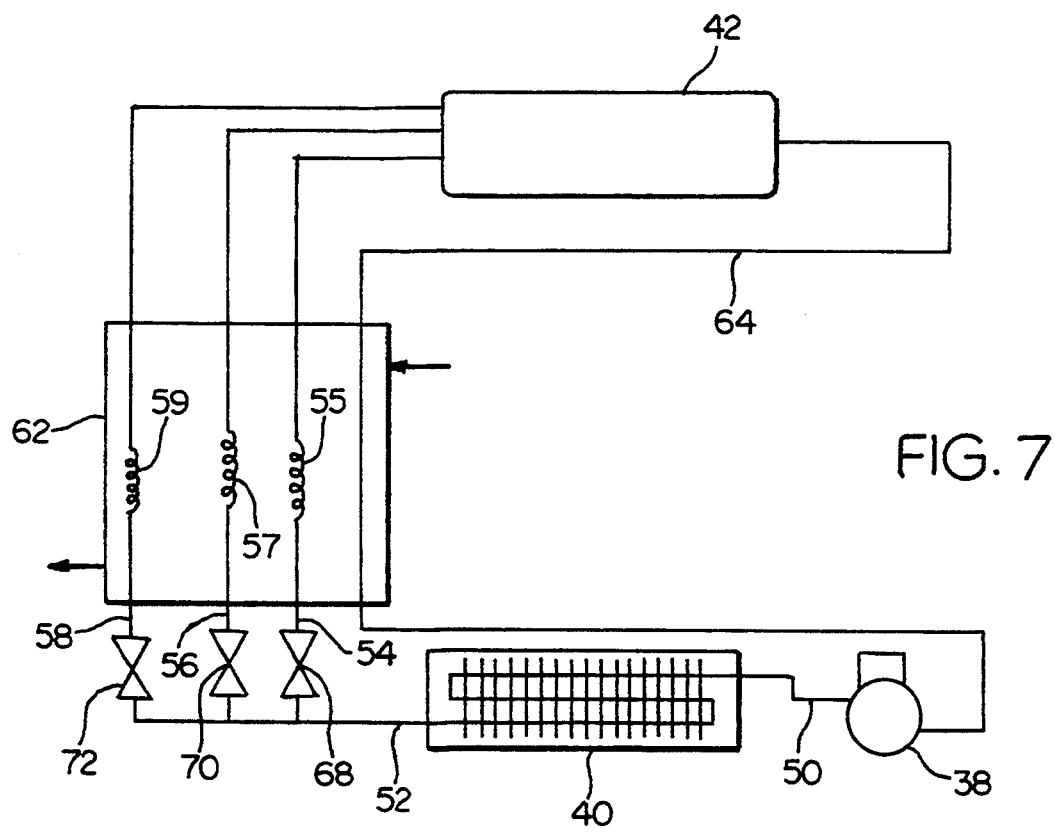
FIG. 7 is a third embodiment of a refrigeration circuit diagram.

A third embodiment of the refrigeration circuit represented by FIG. 7 contains many of the same components which are identified with the same numerals as used in FIG. 3. The primary difference between the embodiment of FIG. 7 and that of FIG. 3 is that the ON/OFF latching valves 68, 70, and 72 are used to regulate the refrigerant flow to the capillaries 55, 57 and 59 on lines 54, 56, and 58 instead of a single four-position valve 60. If the latching type valves are not used then the valve 60 should be a normally closed type and the valve 70 and 72 should preferably also be a normally closed type but a normally open valve can also be used.

Each of the above described refrigerator circuit embodiments can be operated to provide additional evaporator temperature variations in the following manner. In contrast to the above described method of maintaining the appropriate latching valve continuously open to cause continuous flow of refrigerant through the selected capillary tubes and the evaporator 42, one or more of the latching valves may be turned on and off periodically. In this fashion, the flow-rate of refrigerant through the evaporator is controlled, which in turn determines the evaporator pressure and temperature. In operation, this pulsing of one or more of the latching valves allows an initial flooding of the evaporator coil at a relatively high temperature and then a subsequent vacuum condition occurs when the latching valve or valves are turned off. This vacuum condition causes the evaporator to operate at a lower temperature as the evaporator dries of liquid refrigerant and the resulting gas super heats.

Turning again to FIG. 2, it can be seen that the evaporator 42 may be located at the rear of the third compartment 34 of the refrigerator 20. It will be understood to those of skill in the art, however, that the present invention is not limited to this evaporator location only. Three air dampers 80, 82 and 84 are provided to direct the air flow, during operation of the air moving device 44, from either the first compartment 26, the second compartment 30, or the third compartment 34 over the evaporator 42 which is disposed in an evaporator chamber 86. The evaporator chamber 86 may be insulated thermally from the compartments 26, 30 and 34 with insulated panels which may contain vacuum panels to allow for compactness Air flow from any of the compartments 26, 30 or 34 over the evaporator 42 is channelled through one of a plurality of air inlets 88, 90 and 92 and a selected one of a plurality of air outlets 94, 96 and 98. All of the air outlets may be provided with air diffusers (not shown) for uniform air flow distribution to the compartments 26, 30 and 34.

By control of the dampers, therefore, the evaporator 42 may be selectively placed in communication with the compartments. No dampers are required for air inlets 88, 90 and 92 because, as will be understood by those of skill in the art, no substantial air flow will occur through the air inlets without a corresponding air outlet being open. For example, if damper 82 is open, air from the evaporator chamber 86 will be forced through the outlet 96 and this chilled air entering the second compartment 30 will displace relatively warm air which will be "pushed" into the evaporator chamber 86 through air inlet 90. No air will enter the evaporator chamber 86 from air inlets 88 and 92 as dampers 80 and 84 are closed and, therefore, no displacement of air occurs in compartments 26 and 34. As will be understood by those of skill in the art, the air moving device 44 is not capable of drawing air from sealed compartments.

During operation of the refrigerator 20, if the temperature sensor in the third compartment 34 calls for cooling, as is known to those of skill in the art, damper 84 is actuated to open outlet 98 and dampers 82 and 80 are actuated to close outlets 96 and 94 respectively. In this fashion the outlet air from the evaporator 42 is directed to the third compartment 34. The compressor 38 is then operated to cause a flow of refrigerant through line 50 through condenser 40, line 52, through the solenoid valve 60 and any one of capillary lines 54, 56 or 58 to the evaporator 42 and then to return through line 64 to the compressor 38. This causes the evaporator 42 to become chilled to the required temperature. The air moving device 44 then circulates air from compartment 34 over the evaporator 42 for cooling compartment 34. As has been discussed above, the temperature of the evaporator 42 may be controlled to one of a plurality of selectable temperatures based on the capillary selected by valve 60. In this fashion, compartment 34 may be controlled to operate at one of a plurality of selectable temperatures, dependent on the selection of one of the capillaries 55, 57 and 59 for controlling the temperature of the evaporator.

When the temperature sensors in compartment 34 is satisfied, operation of the compressor 38 is terminated and fluid flow of refrigerant through the conduit terminates, other than an equalization of pressure across the compressor 88. If desired, the four-position latching solenoid valve 60 may be closed to all capillaries when the compressor 38 is not operating in order to prevent migration of refrigerant to the evaporator 42 during periods of non use.

The cooling of the other two compartments 26 and 30 can be achieved in a similar fashion as explained above. By a selective control of the dampers and capillaries, each of the compartments may therefore be controlled to one of a plurality of selectable temperatures. Additionally, when the compressor 38 and air moving device 44 are not in operation, all of the dampers 80, 82 and 84 may be actuated closed to minimize migration of the potentially different temperature air from one of the compartments to another compartment.

Figure 8:
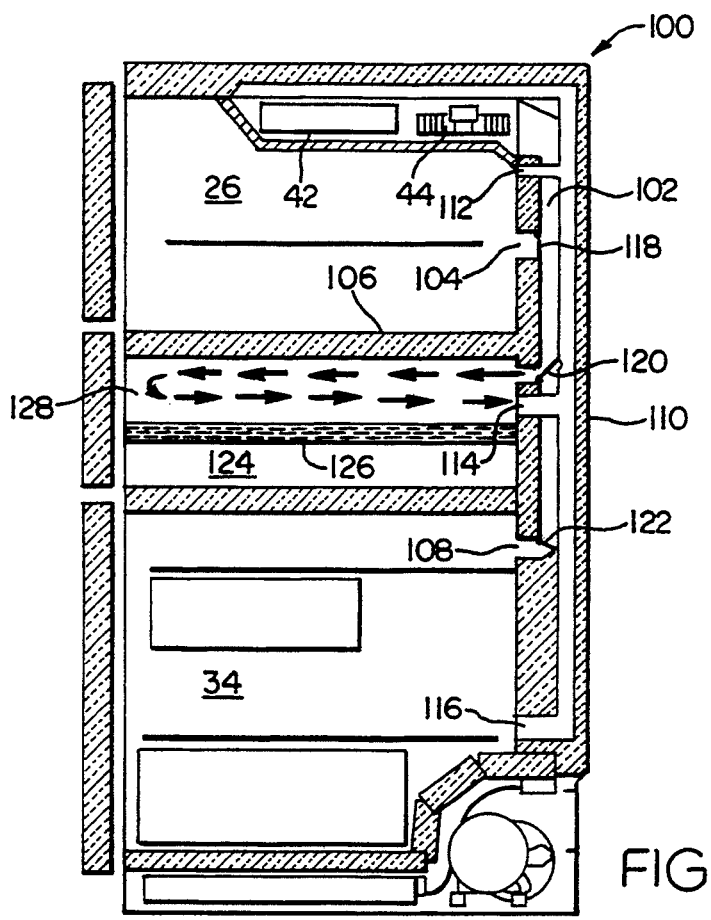
FIG. 8 is a side sectional view of a refrigeration appliance illustrating an additional system for cooling a refrigerator compartment in accordance with the principles of the present invention.

Another system for providing a plurality of multi-temperature compartments in a refrigerator is shown in FIG. 8. In this system, the evaporator 42 is disposed along the upper surface of the first compartment 26 in contrast to along the back of third compartment 34. As will be understood by one of skill in the art, however, the evaporator 42 may be located in any appropriate and convenient location within the refrigerator. An outlet conduit 102 having a plurality of air outlets 104, 106, and 108 and an inlet conduit 110 having a plurality of air inlets 112, 114 and 116 are provided, similar to FIG. 2. Additionally, a plurality of dampers 118, 120 and 122 are provided for controlling the flow of chilled air from the compartments over the evaporator 42. The evaporator 42 may be controlled to operate at a plurality of temperatures as described above.

In contrast to the refrigerator 20 of FIG. 2, however, the refrigerator 100 shown in FIG. 8 includes a controlled temperature compartment 124. Associated with the controlled temperature compartment 124 is a phase change material disposed in a flask 126. Additionally, a heat transfer chamber 128 is provided adjacent to the flask 126. The phase change material in the flask 126 operates to tightly control the temperature of the controlled temperature compartment 124 while maintaining the controlled temperature compartment 124 at a high level of humidity. Such a compartment may be designed for storing meat at a relatively high humidity and at a temperature just below freezing. These conditions have been shown to preserve meat better than conventional compartments of temperatures slightly above 0° C. The phase change material, therefore, is designed to have a liquid/solid transformation temperature at the desired temperature of the controlled temperature compartment 124. Such phase change materials may be water with various additives, such as propylene glycol, to depress the freeze point.

During operation of the refrigerator 100, if a sensor in the phase change material indicates that the phase change material has substantially transitioned from solid to liquid, the refrigerator 100 is operated to freeze the phase change material. The phase change material sensor may be a temperature sensor or a conductivity sensor or other known sensors. During operation to freeze the phase change material, the damper 120 is actuated to open the outlet conduit 106 to the heat transfer chamber 128. The compressor 38 operates to cause a flow of refrigerant through the evaporator 42, as described above. This causes the evaporator 42 to become chilled while the air moving device 44 circulates air through the compartment 124 over the evaporator 42 to provide cooling for the phase change material wherein the phase change material may transition from a liquid to a solid. The flask 126 may include structure for enhancing thermal transfer from the flask 126 to the air moving through the heat transfer chamber 128, such as fins.

The evaporator 42 may be controlled to operate at any temperature less than the transition temperature of the phase change material. When the phase change material has completely frozen, operation of the compressor 38 is terminated and fluid flow of refrigerant through the conduits terminates, other than an equalization of pressure across the compressor 88. The flask 126 containing the phase change material operates, therefore, as a heat sink for cooling the associated controlled temperature compartment 124 to a temperature just at the transition temperature.

In this fashion, the controlled temperature compartment 124 may be tightly controlled to a specific temperature equivalent to the transition temperature of the phase change material. Additionally, no direct air transfers from the controlled temperature compartment 124 to the evaporator chamber 86 such that the controlled temperature compartment is not dehumidified by the action of the evaporator 42. This cooling scheme, therefore, provides an excellent compartment for storing meats. Furthermore, the remaining compartments may be controlled to any one of a plurality of selectable temperatures as described above.

Figure 9:
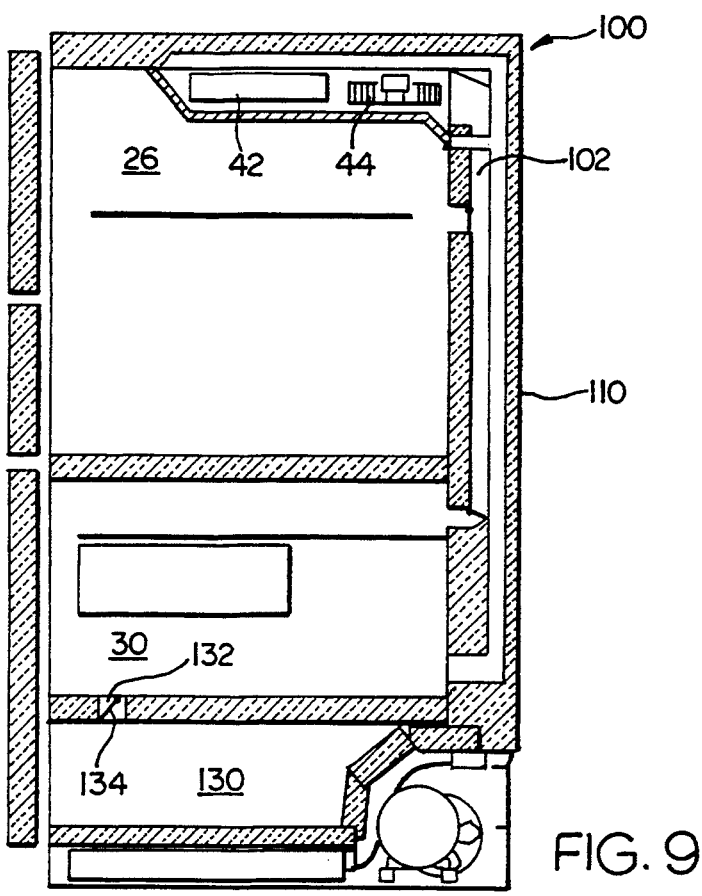
FIG. 9 is a side sectional view of a refrigerator appliance illustrating yet another system for cooling a refrigerator compartment in accordance with the principles of the present invention.

Yet another configuration for providing a plurality of multi-temperature compartments in a refrigerator is shown in FIG. 9. This additional configuration may be preferably included in a refrigerator system as described in FIGS. 2 or 8 above. As shown, the evaporator 42 is located along the upper surface of the first compartment 26 which in this illustration has been enlarged. In a similar fashion as described above, the evaporator is in communication with the first compartment 26 and the second compartment 30. The third compartment 34, however, has been replaced by a subordinated compartment 130. The subordinated compartment 130 is disposed adjacent the second compartment 30 and has a selectively controllable supply duct 132 for providing communication between the subordinate compartment 130 and the second compartment 30. A flapper damper or shuttle type damper 134 may be provided for controlling communication between the compartments 130 and 126. The subordinate compartment is not cooled directly by the evaporator 42, but rather is cooled indirectly through the controllable communication with the first compartment 26. The supply duct 132 allows for naturally driven flow of chilled air into the subordinate compartment 130. In this fashion, therefore, the subordinate compartment 130 may be controlled to any temperature level higher than the temperature of the second compartment 30. As contemplated by the inventors, a subordinate compartment may be provided in combination with any of various refrigeration configurations as disclosed in the present invention.

The present invention may also provide for the control of the humidity level of each compartment. As will be understood by those of skill in the art, when the evaporator operates at a low pressure and low (cold) temperature, such as caused by capillary 55, it provides a high dehumidification effect. When the evaporator operates at a medium pressure and medium (freezing) temperature, it provides a medium dehumidification effect. When the evaporator operates at a high pressure and high temperature (cool), it provides a low dehumidifying effect. During operation of the evaporator in combination with the low pressure capillary 55, therefore, the particular compartment being cooled by the evaporator will be maintained at a relatively low humidity due to the dehumidifying effect of the evaporator 42 when operating at a low temperature. In contrast, during operation of the evaporator 42 in combination with the medium pressure capillary 57, the particular compartment being cooled by the evaporator will be maintained at a relatively high humidity as the relatively high temperature evaporator has a reduced dehumidifying effect. This reduced dehumidifying effect is even greater when operation the evaporator 42 in combination with the capillary 59 such that the particular compartment being cooled by the evaporator will be maintained at an even higher humidity level.

It is possible, therefore, to operate the refrigerator to provide relatively high temperature compartments (5° C.) at a high humidity, in contrast to standard refrigeration systems. However, it is also possible to provide a relatively high temperature compartment at a low humidity.

Figure 10:
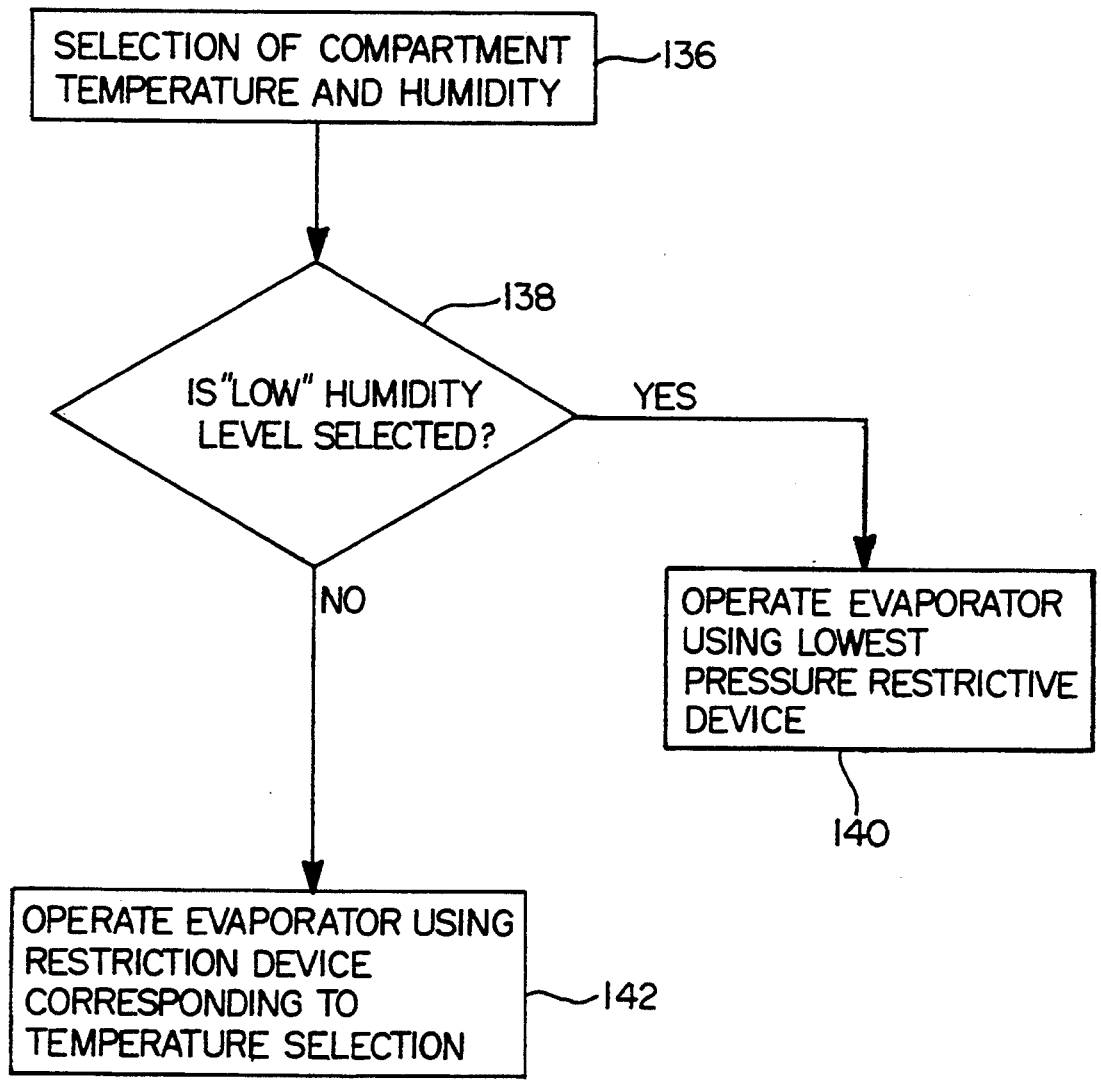
FIG. 10 is a flow chart illustrating the control sequence for controlling the humidity level within each refrigerator compartment.

FIG. 10 illustrates a flow chart illustrating the control sequence for controlling the humidity level within each of the plurality of compartments in direct communication with the evaporator. As shown at 136, the first step is the selection by the operator of the the desired temperature level—cold, freezing, or cool—and the selection of the desired humidity level—high or low. If a low humidity level is selected as determined at 138, the evaporator is controlled to operate using the lowest pressure restrictive device (capillary 55). In this mode of operation as shown at 140, if a freezing or cool temperature level has been selected with a low humidity, the refrigerator is operating in an inefficient power usage mode but is, however, providing the maximum dehumidification effect possible. Furthermore, in this mode, the compressor 38 and air moving device 44 are cycled on and off for controlling the compartment temperature as is known.

If a high humidity level has been selected as determined at 138, the evaporator is controlled to operate in combination with the appropriate restriction device as shown at 142, as illustrated in FIG. 5. In this configuration, the refrigerator operates at optimum energy efficiency while providing a relatively high humidity level for compartments selected to operate at a freezing or cool temperature. The inventors have contemplated that a high humidity level selection would be the default configuration for operation of the refrigerator when the operator has not selected between the high or low humidity level setting.

Figure 11:
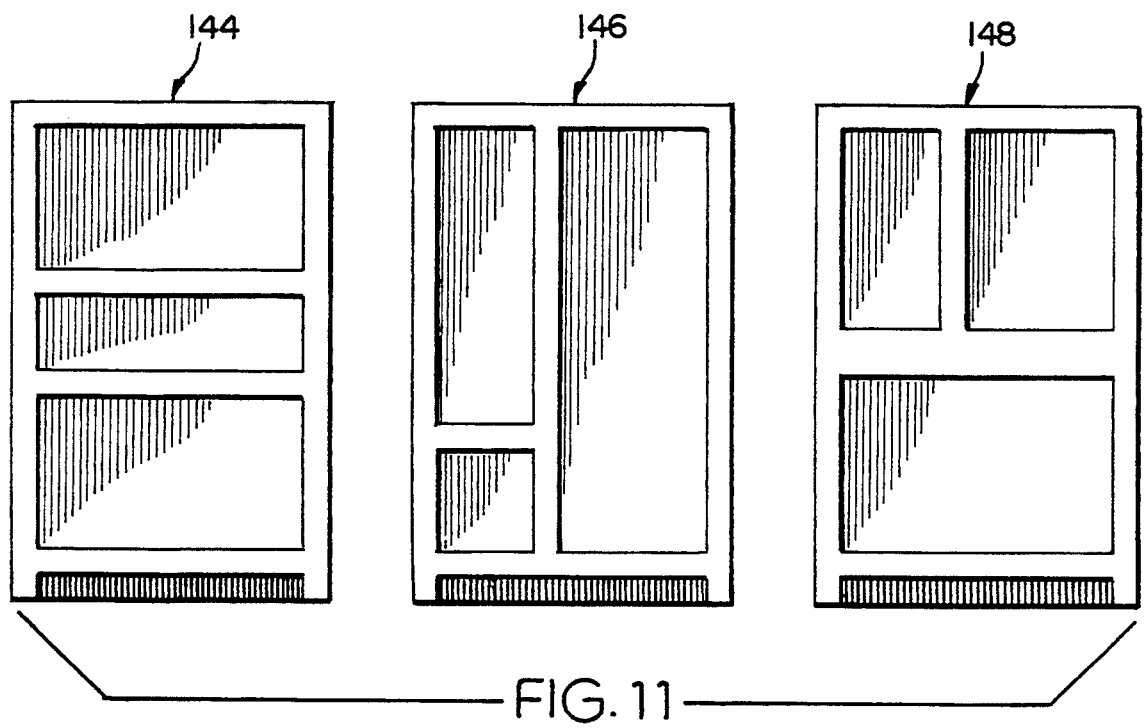
FIG. 11 is a representation of convertible refrigeration compartment configurations for a three-compartment refrigerator.
Figure 12:
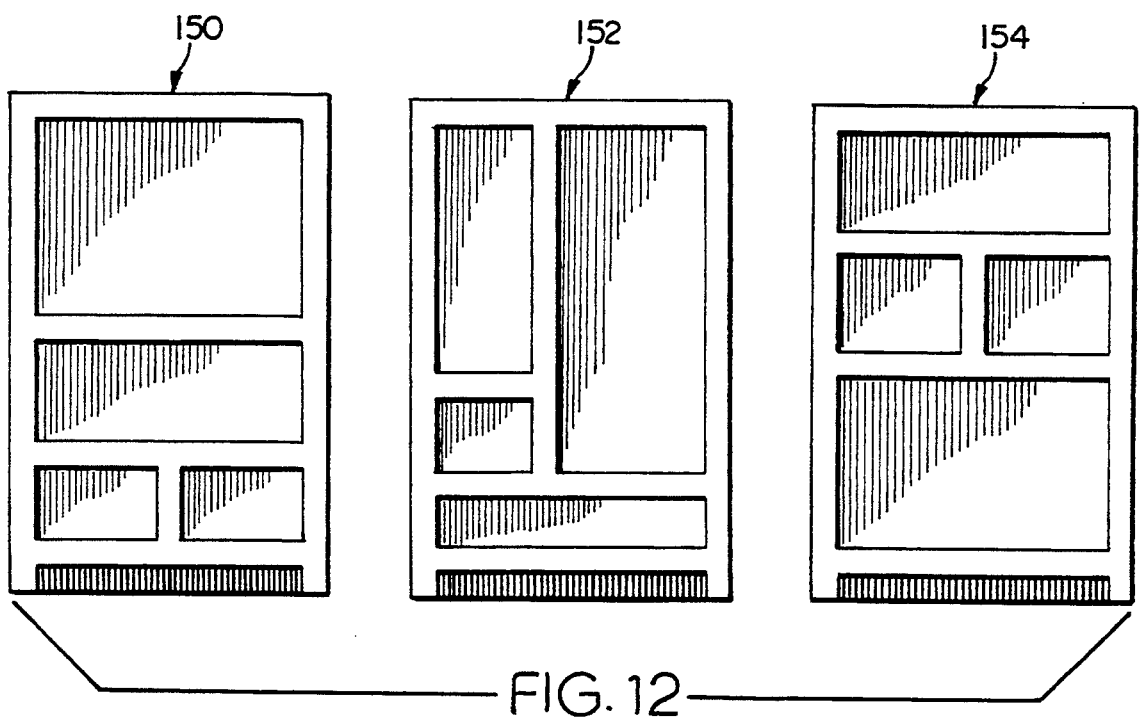
FIG. 12 is a representation of a convertible refrigeration compartment configurations for a four-compartment refrigerator.

In this manner, the present invention may provide a refrigerator having a plurality of compartments wherein the temperature and humidity level of each compartment is selectable. For example, this type of control may accommodate the operation of high humidity, high temperature vegetable compartments; or medium temperature, high humidity meat compartment; or high temperature, low humidity beverage compartments. FIG. 11 and 12 represent possible compartment options for refrigerators having three of four compartment, respectively. Utilizing the above described refrigerator systems allow for operation of these various refrigerator compartment options in many different configurations. For example, refrigerator 152 may be controlled to have a cold (−18° C.) and dry freezer compartment, a cool (5° C.) and moist fresh food compartment, a near freezing (0° C.) and moist meat compartment, and a relatively warm (8° C.) and moist vegetable compartment. Alternatively, all compartments could be controlled to operate in a freezer mode (cold and dry) or a fresh food mode (cool and moist). Additionally, the smaller sized compartments could be operated to provide a quick freeze compartment with cold and dry air supplied thereto. As can be understood by one of skill in the art, many other types of combinations may be possible wherein all of the compartments are convertible between a plurality of modes of operation while utilizing a single evaporator.

As is apparent from the foregoing specification, the invention is susceptible of being embodied with various alterations and modification which may differ particularly from those that have been described in the preceding specification and description. It should be understood that we wish to embody within the scope of the patent warranted heron all such modification as reasonable and properly come within the scope of our contribution to the art.

We claim:

1. A refrigeration appliance, comprising:
    a plurality of refrigeration compartments;
    a plenum in communication with each of said compartments;
    a single evaporator located in said plenum;
    a condenser;
    a single compressor;
    a refrigerant circuit comprising a series of conduits for providing a flow of refrigerant through said condenser, said evaporator and said compressor;
    a plurality of restriction devices in said series of conduits connecting said condenser with said evaporator, said restriction devices operating at a plurality of different pressure levels;
    valve means in said refrigerant circuit for directing refrigerant to a selected one of said restriction devices;
    a plurality of movable baffles for selectively opening and closing communication between said plenum and each of said compartments; and
    means for controlling said valve means and said plurality of baffles for selectively maintaining each of said compartments at any of a plurality of selectable temperature and selectable humidity levels such that each of said compartments is supplied with chilled air at the required temperature and humidity.

2. A refrigerator appliance according to claim 1 wherein said plurality of refrigeration compartments further comprise:
    a first compartment;
    a second compartment; and
    a third compartment.

3. A refrigerator appliance according to claim 1 wherein said plurality of restriction devices further comprises:
    a first restriction device in said series of conduits connecting said condenser with said evaporator, said restriction device operating at a first pressure level;
    a second restriction device in said series of conduits connecting said condenser with said evaporator, said second restriction device operating at a pressure level higher than said first pressure level; and
    a third restriction device in said series of conduits connecting said condenser with said evaporator, said third restriction device operating at a pressure level higher than said second pressure level.

4. A refrigerator appliance according to claim 3 wherein said first restriction device, said second restriction device and said third restriction device are connected in parallel with each other between said condenser and said evaporator.

5. A refrigerator appliance according to claim 1, wherein:
    said plurality of restriction devices further comprises a first restriction device in said series of conduits connecting said condenser with said evaporator, said restriction device operating at a first pressure level, a second restriction device in said series of conduits connecting said condenser with said evaporator, said second restriction device operating at a pressure level higher than said first pressure level; and said valve means in said refrigerant circuit further comprises means for directing refrigerant to a selected one of said restriction devices for operating a selected one of said restriction devices for operating said evaporator at two distinct pressure levels, and means for directing refrigerant to both restriction devices for operating said evaporator at a third distinct pressure level.

6. A refrigerator appliance according to claim 1 wherein said plurality of selectable temperature levels further comprises:

a first temperature level below 0 degrees centigrade;

a second temperature level at 0 degrees centigrade;

a third temperature level above 0 degrees centigrade.

7. A refrigerator appliance according to claim 6 further comprising:

means for operating any of said compartments maintained at said second temperature level at a high humidity level or a low humidity level.

8. A refrigerator appliance according to claim 6 further comprising:

means for operating any of said compartments maintained at said third temperature level at a high humidity level or a low humidity level.

9. A refrigerator appliance according to claim 1 further comprising:

a controlled temperature compartment having a phase change material associated with and positioned for heat transfer with said controlled temperature compartment;

a heat transfer chamber disposed adjacent of said phase change material, said plenum in communication with said heat transfer chamber; and wherein said plurality of movable baffles further selectively opens and closes communication between said plenum and said heat transfer chamber such that said phase change material is maintained at its liquid/solid transition temperature.

10. A refrigerator appliance according to claim 1, further comprising:

a subordinate compartment, said subordinate compartment positioned adjacent at least one of said plurality of refrigerator compartments; and a supply duct for providing communication between said subordinate compartment and said at least one of said plurality of compartments wherein said subordinate compartment is cooled by controlled air flow between said subordinate compartment and said at least one of said plurality of refrigerant compartments.

11. A refrigerator appliance according to claim 10, further comprising:

a damper positioned on said supply duct for controlling air flow between said subordinate compartment and said at least one of said plurality of compartments.

12. A refrigerator according to claim 1, wherein said compressor has variable cooling capacity.

13. A refrigeration appliance, comprising:

a single evaporator located in said refrigeration appliance;

a single compressor;

a condenser;

a refrigerant circuit comprising a series of conduits for providing a flow of refrigerant through said condenser, said evaporator and said compressor;

a plurality of restriction devices in said series of conduits connecting said condenser with said evaporator, said restriction devices operating at a plurality of different pressure levels;

valve means in said refrigerant circuit for directing refrigerant to a selected one of said restriction devices;

a selectively variable temperature compartment in communication with said evaporator;

a controlled temperature compartment having a phase change material associated with and positioned for heat transfer with said controlled temperature compartment, said phase change material further being in communication with said evaporator such that said phase change material is maintained at said transition temperature; and means for controlling said valve means for selectively maintaining said variable temperature compartment at any of a plurality of selectable temperature and selectable humidity levels such that said variable temperature compartment is supplied with chilled air at the required temperature and humidity.

14. A refrigeration appliance according to claim 13, further comprising:

a heat transfer chamber associated with said phase change material;

a plenum in communication with said variable temperature refrigeration compartment and said heat transfer chamber, said evaporator being located in said plenum; and a plurality of movable baffles for selectively opening and closing communication between said plenum and said variable temperature compartment and said heat transfer chamber.

15. A refrigeration appliance according to claim 13, further comprising:

a plurality of selectively variable temperature compartments;

a plenum in communication with said variable temperature refrigeration compartment and said heat transfer chamber, said evaporator being located in said plenum; and a plurality of movable baffles for selectively opening and closing communication between said evaporator and each of said variable temperature compartments.

16. A refrigerator appliance according to claim 13, further comprising:

a subordinate compartment, said subordinate compartment positioned adjacent said selectively variable temperature compartment; and a supply duct for providing communication between said subordinate compartment and said selectively variable temperature compartment wherein said subordinate compartment is cooled by controlled air flow between said subordinate compartment and said selectively variable temperature compartment.

17. A refrigerator appliance according to claim 16, further comprising:

a damper positioned on said supply duct for controlling air flow between said subordinate compartment and said selectively variable temperature compartment.

18. A refrigeration appliance, comprising:
a plurality of refrigeration compartments;
a plenum in communication with each of said compartments;
a single evaporator located in said plenum;
a condenser;
a compressor fluidly interconnected with said evaporator and said condenser for pumping refrigerant through said evaporator and said condenser;
means for operating said single evaporator at a plurality of different pressure levels;
means for selectively opening and closing communication between said plenum and each of said compartments; and
means for selectively maintaining each of said compartments at any of a plurality of selectable temperature and selectable humidity levels such that each of said compartments is supplied with chilled air at the required temperature and humidity.

19. A refrigerator appliance according to claim 18, further comprising:
means for cooling a first compartment of said compartments to a temperature slightly below 0° C. and at a relatively low humidity for providing a freezer compartment;
means for cooling a second compartment of said compartments to a temperature around 0° C. and at a relatively high humidity for providing a meat compartment; and
means for cooling a third compartment of said compartments to a temperature slightly above 0° C. and at a relatively high humidity for providing a fresh food compartment.

20. A refrigerator appliance according to claim 18, further comprising:
means for cooling a fourth compartment of said compartments to a temperature slightly above said third compartment and at a relatively high humidity for providing a fresh vegetable compartment.

21. A refrigerator appliance according to claim 18, further comprising:
means for providing a controlled temperature compartment associated with a phase change material wherein no direct air transfer between said plenum and said controlled temperature compartment occurs.

22. A refrigerator appliance according to claim 18, further comprising:
means for providing a subordinate compartment wherein said subordinate compartment communicates with an adjacent one of said plurality of compartments.

23. A refrigeration appliance, comprising:
a refrigeration compartment;
a plenum in communication with said compartment;
a single evaporator located in said plenum;
a condenser;
a single compressor fluidly interconnected with said evaporator and said condenser for pumping refrigerant through said evaporator and said condenser;
means for selecting a temperature level for said compartment;
means for selecting a humidity level for said compartment;
means for operating said evaporator at a plurality of different pressure levels in response to said temperature level selecting means and said humidity level selecting means such that said compartment is supplied with chilled air at the required temperature and humidity;
a subordinate compartment, said subordinate compartment positioned adjacent said compartment; and
a supply duct for providing communication between said Subordinate compartment and said compartment wherein said subordinate compartment is cooled by controlled air flow between said subordinate compartment and said compartment.

24. A refrigerator appliance according to claim 23, further comprising:
a plurality of compartments wherein each of said compartments is in communication with said plenum;
means for selecting a temperature level for each of said plurality of compartments;
means for selecting a humidity level for each of said plurality of compartments;
means for controlling communication between said plenum and said compartments; and
means for independently operating said evaporator for each of said compartments at a plurality of different pressure levels in response to said temperature level selecting means and said humidity level selecting means such that each of said compartments is supplied with chilled air at the required temperature and humidity.

25. A refrigerator appliance comprising:
a refrigeration compartment;
a plenum in communication with said compartment;
a single evaporator located in said plenum;
a condenser;
a single compressor fluidly interconnected with said evaporator and said condenser for pumping refrigerant through said evaporator and said condenser;
means for selecting a temperature level for said compartment;
means for selecting a humidity level for said compartment;
means for operating said evaporator at a plurality of different pressure levels in response to said temperature level selecting means and said humidity level selecting means such that said compartment is supplied with chilled air at the required temperature and humidity;
a first restriction device fluidly interconnected between said condenser and said evaporator, said restriction device operating at a first pressure level;
a second restriction device fluidly interconnected between said condenser and said evaporator, said second restriction device operating at a pressure level higher than said first pressure level; and
a third restriction device fluidly interconnected between said condenser and said evaporator, said third restriction device operating at a pressure level higher than said second pressure level.

26. A refrigerator appliance according to claim 25, further comprising:
a plurality of compartments wherein each of said compartments is in communication with said plenum;
means for selecting a temperature level for each of said plurality of compartments;
means for selecting a humidity level for each of said plurality of compartments;

means for controlling communication between said plenum and said compartments; and means for independently operating said evaporator for each of said compartments at a plurality of different pressure levels in response to said temperature level selecting means and said humidity level selecting means such that each of said compartments is supplied with chilled air at the required temperature and humidity.

27. A refrigerator appliance according to claim 25, further comprising:
a controlled temperature compartment having a phase change material associated with and positioned for heat transfer with said controlled temperature compartment;
a heat transfer chamber disposed adjacent of said phase change material, said plenum in communication with said heat transfer chamber; and
means for selectively opening and closing communication between said plenum and said heat transfer chamber such that said phase change material is maintained at its liquid/solid transition temperature.

28. A refrigerator appliance according to claim 25, further comprising:
a subordinate compartment, said subordinate compartment positioned adjacent said compartment; and
a supply duct for providing communication between said subordinate compartment and said compartment wherein said subordinate compartment is cooled by controlled air flow between said subordinate compartment and said compartment.

29. A refrigerator appliance comprising:
a refrigeration compartment;
a plenum in communication with said compartment;
a single evaporator located in said plenum;
a condenser;
a single compressor fluidly interconnected with said evaporator and said condenser for pumping refrigerant through said evaporator and said condenser;
means for selecting a temperature level for said compartment;
means for selecting a humidity level for said compartment;
means for operating said evaporator at a plurality of different pressure levels in response to said temperature level selecting means and said humidity level selecting means such that said compartment is supplied with chilled air at the required temperature and humidity;
a controlled temperature compartment having a phase change material associated with and positioned for heat transfer with said controlled temperature compartment;
a heat transfer chamber disposed adjacent of said phase change material, said plenum in communication with said heat transfer chamber; and
means for selectively opening and closing communication between said plenum and said heat transfer chamber such that said phase change material is maintained at its liquid/solid transition temperature.

30. A refrigerator appliance according to claim 29, further comprising:
a subordinate compartment, said subordinate compartment positioned adjacent said compartment; and
a supply duct for providing communication between said subordinate compartment and said compartment wherein said subordinate compartment is cooled by controlled air flow between said subordinate compartment and said compartment.

31. A method of operating a refrigeration appliance having a refrigerator compartment, a plenum in communication with said compartment, a single evaporator located in said plenum, a condenser and a single compressor fluidly interconnected with said evaporator and said condenser, a controlled temperature compartment having a phase change material associated with and positioned for heat transfer with said controlled temperature compartment, and a heat transfer chamber disposed adjacent of said phase change material, said plenum in communication with said heat transfer chamber, comprising the steps of:
selecting a temperature level for said compartment;
selecting a humidity level for said compartment; and
operating said evaporator at a plurality of different pressure levels in response to said temperature level selecting means and said humidity level selecting means such that said compartment is supplied with chilled air at the required temperature and humidity;
selectively opening and closing communication between said plenum and said heat transfer chamber such that said phase change material is maintained at its liquid/solid transition temperature.

32. A method for operating a refrigerator appliance according to claim 31, further comprising the steps of:
providing a plurality of compartments wherein each of said compartments is in communication with said plenum;
selecting a temperature level for each of said plurality of compartments;
selecting a humidity level for each of said plurality of compartments;
controlling communication between said plenum and said compartments; and
independently operating said evaporator for each of said compartments at a plurality of different pressure levels in response to said temperature level selecting means and said humidity level selecting means such that each of said compartments is supplied with chilled air at the required temperature and humidity.

* * * * *